Patented Jan. 26, 1926.

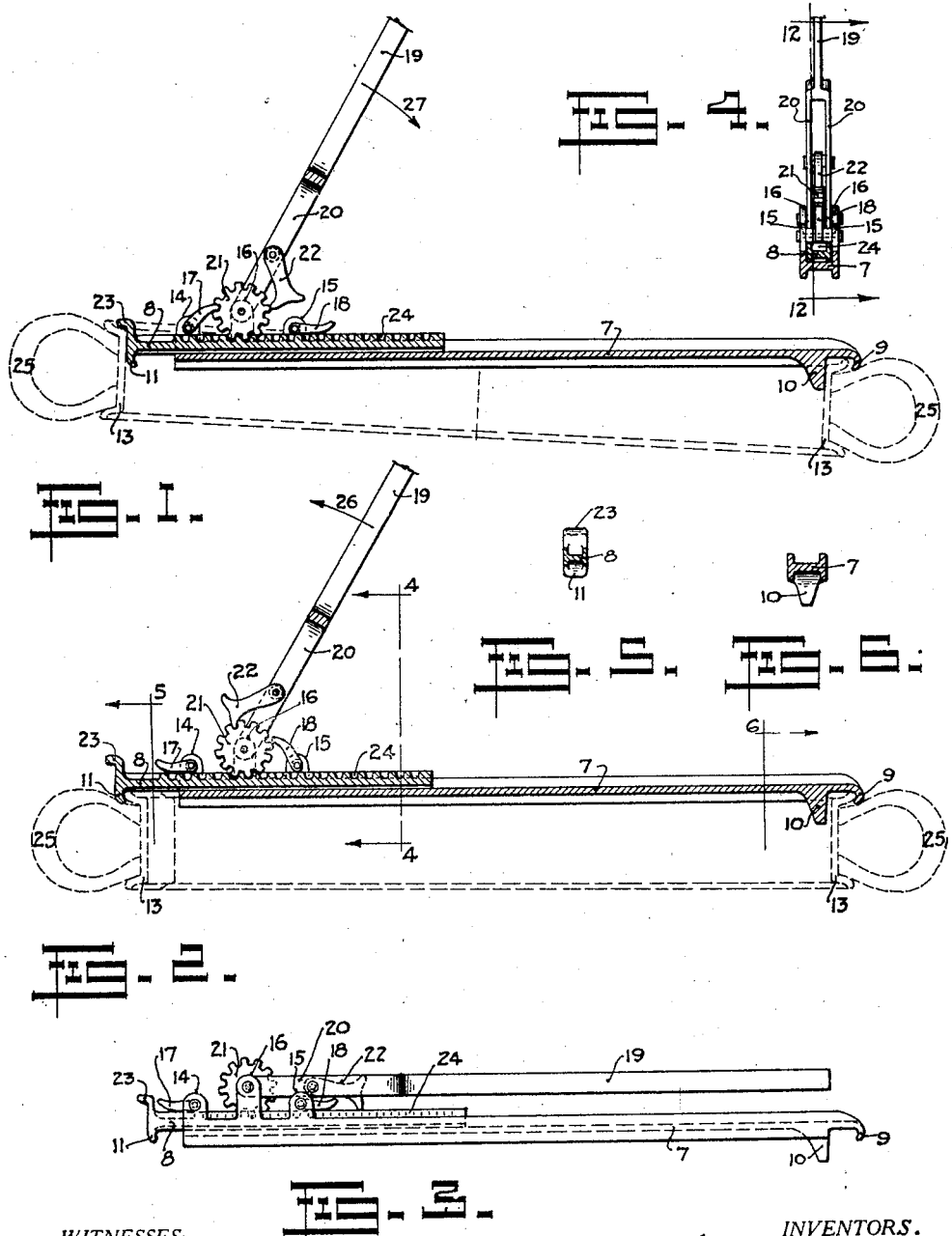

1,570,719

UNITED STATES PATENT OFFICE.

HERBERT J. ADAIR, OF ARDMORE, AND EDWARD J. FLANNERY, OF PHILADELPHIA, PENNSYLVANIA.

AUTOMOBILE RIM COMPRESSOR.

Application filed January 14, 1919, Serial No. 271,111. Renewed December 6, 1924.

*To all whom it may concern:*

Be it known that we, HERBERT J. ADAIR and EDWARD J. FLANNERY, citizens of the United States of America, and residents, respectively, of the town of Ardmore, county of Montgomery, and State of Pennsylvania, and of the city and county of Philadelphia and State of Pennsylvania, have invented a new and Improved Automobile Rim Compressor, and do hereby declare the following to be a full, clear, and exact description of the same, reference being had to the accompanying drawing, forming a part of the specification, and to the reference numbers marked thereon.

Our present invention relates to a tool intended primarily to facilitate the removal of an automobile tire from the rim on which it is supported with as little effort as possible on the part of the operator, and further intended to replace said rim upon the tire after same had been repaired.

The main object of the invention is to provide a tool sufficiently strong to facilitate the removal of large rims, and of such simplicity of operation as to make such removal as unlaborious as possible.

In carrying out our invention we provide a main member upon which slides an auxiliary member and suitable means for moving the auxiliary member relative to the main member and for locking it in the necessary position of operation.

Figure 1 represents a longitudinal section of the rim compressor taken on line 12—12 of Figure 4, looking in the direction of the arrow, and showing the tool in position for replacing the rim on a tire.

Figure 2 represents a longitudinal section through the rim compressor taken on line 12—12 of Figure 4, looking in the direction of the arrow, and shows its position for unlocking the rim and removing same from the tire.

Figure 3 shows a side view of the tool and its appearance when collapsed for placement in a tool-box.

Figure 4 shows a section taken on line 4—4 of Figure 2, looking in the direction of the arrow, and showing therein the position of the movable parts.

Figure 5 is a section on line 5 of the auxiliary member as shown in Figure 2 and looking in the direction of the arrow.

Figure 6 is a section through the main member on line 6 of Figure 2, looking in the direction of the arrow.

The main member of this tool is formed in the present instance of an H shaped section shown at 7, terminating at one end in a hook 9 and a shoulder or lug 10. The auxiliary member 8 is formed of an H shaped section, one end of which terminates into a hook 11 and a projecting shoulder 23.

The main body of member 8 has cast integral therewith, rack teeth 24, throughout most of its length, which are engaged by a small gear or pinion 21, as will be hereinafter described.

The main member 7 is provided at the end opposite to hook 9 and on both sides of its H section with bearing flanges 14, 15 and 16.

The flanges 14 and 15 support through bearing pins or rivets, ratchets or dogs 17 and 18 intended to engage the teeth of gear or pinion 21 in the fashion hereinafter described.

Flanges 16 support through a bearing pin the forked lever 19, which holds within its forking the gear or pinion 21, which is, in turn, in constant engagement with the rack 24 of the auxiliary member 8.

A double pointed ratchet or dog 22 is also supported through a pin, bolt or rivet, by the forking members 20 of the forked lever 19, and is intended to act on the gear 21 in a manner hereinafter described.

To facilitate the action of the various parts of this tool, washers are provided between the bearing flanges 14 and 15 on both sides of the main member 7 and the ratchets or dogs 17 and 18. These washers are of sufficient size to slidably engage the flanges of the H shaped section of the auxiliary member 8, and thereby take up the strain incidental to the operation of the tool.

Washers are also provided between the fork-members 20 of the lever 19 and the gear or pinion 21; also between the said fork-members 20 and the double ratchet or dog 22.

The hook 9 on the main member and hook 11 on the auxiliary member of the tool are of such form as to easily engage the beads of the automobile tire rim of any form, that is the clincher, straight edge or other similar form in use to-day.

The lug 10 on the main member 7 is intended to engage the inner face of the tire rim, in which case the hook end 9 acts as a rest. The opposite lug 23 of the auxiliary member 8 is intended for a rest when the outer end of the hook 11 is used against the inside face of the rim for replacing the rim on the tire.

The action of this rim compressor will be easily understood from the following description:

After releasing the air from an automobile tire and unlocking the split-rim, hooks 9 and 11 of this tool are placed over the beads of rim 13 as shown in Figure 2, and then the movable parts are arranged in the position shown in said figure, that is, the ratchet or dog 18 is in engagement with gear or pinion 21 and ratchet or dog 17 is at rest; the double ratchet or dog 22 also being in engagement with gear or pinion 21 in the position shown. By moving the lever 19 back and forth and exerting a pressure in the direction shown by arrow 26 in Figure 2, hooks 9 and 11 are moved towards each other and thus compress the rim 13 and release it from the tire 25, both rim and tire being shown for the purpose of this illustration by dotted lines.

To replace the rim on the tire, the end 9 of the main member is set on the beads of the rim 13 with lug 10 against its inner face and the end of the auxiliary member 8 is set against the inner face of the opposite side of rim 13 with the lug 23 resting on the edge of this rim, as shown in Figure 1, and then the movable parts are arranged in the position shown in said figure, that is, the ratchets or dogs 17 and 22 are in engagement with gear or pinion 21 as shown, whereas the ratchet or dog 18 is at rest. By moving the lever 19 back and forth and exerting a pressure in the direction shown by arrow 27 in Figure 1, the end 11 and lug 10 are moved away from each other and are thereby pressing the rim 13 against the tire 25 and in its final position for locking.

It is obvious from the above description that the lever 19 through the action of the ratchet or dog 22 and the gear or pinion 21 as above described exerts a great force on the auxiliary member 8 relative to main member 7 accomplishing thereby the result for which this invention is intended.

Although we have illustrated this tool as manufactured of malleable cast iron, it is evident that it could be just as easily manufactured of wrought or stamped metal, and that various parts of this apparatus may be slightly varied without affecting the principles of this invention.

We do not, therefore, wish to be restricted to the exact details of construction shown or described above, for as has been indicated, it is obvious that a tool with slight modifications from the above, but comprising a main member with end suitable to engage a tire rim and with an auxiliary member similarly equipped, sliding thereon, the two operated by a lever, ratchet and gear arrangement with a view to exerting a great pull or push upon the rim of the tire as heretofore described will come within the scope of our invention.

Having thus described our invention what we claim and desire to secure by Letters Patent is:

1. A tire tool comprising a main member provided at one end with a hook for engaging an edge of a tire rim and an abutment arranged to bear against the inner face of said rim, an auxiliary member slidably connected with the main member and having a head providing an abutment adapted to bear against the inner face of the rim and having at one end a hook like portion for engaging the edge of the rim and supporting the device, the opposite end of said head forming a hook adapted to be engaged with the edge of the rim, means for effecting relative longitudinal movement between said members, and means for retaining the parts in adjusted relation.

2. A tire tool comprising two members telescopically connected and adapted to extend in substantially the same planes across a tire rim, one of said members being provided at its outer end with a hook, as 9, for engaging with an edge of the rim and with a lug, 10, adapted to contact with the inner face of the rim, the other member having at its outer end a head having a surface adapted to abut against the inner face of the rim and oppositely directed hook like portions at its top and bottom edges, means for effecting relative longitudinal movement between said members, and means for retaining the parts in adjusted relation.

3. A tire tool comprising a member provided with an elongated body having a longitudinal channel formed in one face and provided at one end with an abutment, adapted to bear against the inner face of a wheel rim, and a hook adapted to take over the edge of the rim, a second T shaped member having its stem extending into the channel in the first said member and its head adapted to bear against the inner face of a wheel rim, said head having means for engaging the edge of the rim, means mounted on the channel member for engaging and positively moving the T-shaped member longitudinally, and means cooperating with the stem of the T-shaped member for retaining said stem in the channel of the first said member.

4. A tire tool comprising a member provided with an elongated body having a longitudinal channel formed in one face and provided at one end with an abutment adapted to bear against the inner face of a wheel rim and a hook adapted to take over the edge of the rim, a second T shaped member having its stem extending into the channel in the first said member and provided on its upper face with a series of teeth constituting a rack, the head of said second member being adapted to bear against the inner face of a wheel rim and having means for engaging the edge of the rim, a gear supported by bearings on the channel member and engaging said rack, a lever adapted to turn said gear, pawls pivoted to the channel member on opposite sides of the gear axis and each adapted to limit turning movement of the gear in one direction, and washers surrounding the pivot pins of said pawls and cooperating with the stem of the T shaped member to maintain it in the channel of the first said member.

In testimony whereof we have signed our names to this specification.

HERBERT J. ADAIR.
EDWARD J. FLANNERY.